US011079868B2

(12) United States Patent
Lee

(10) Patent No.: US 11,079,868 B2
(45) Date of Patent: Aug. 3, 2021

(54) TOUCH PANEL RECOGNIZING VIRTUAL TOUCHES IN ADDITION TO ACTUAL TOUCHES, METHOD FOR OPERATION OF SUCH TOUCH PANEL, AND TOUCH DISPLAY DEVICE

(71) Applicants: Interface Technology (ChengDu) Co., Ltd., Chengdu (CN); INTERFACE OPTOELECTRONICS (SHENZHEN) CO., LTD., Shenzhen (CN); GENERAL INTERFACE SOLUTION LIMITED, Zhunan (TW)

(72) Inventor: Hsuan-Yun Lee, New Taipei (TW)

(73) Assignees: Interface Technology (ChengDu) Co., Ltd., Chengdu (CN); INTERFACE OPTOELECTRONICS (SHENZHEN) CO., LTD., Shenzhen (CN); GENERAL INTERFACE SOLUTION LIMITED, Zhunan (TW)

( * ) Notice: Subject to any disclaimer, the term of this patent is extended or adjusted under 35 U.S.C. 154(b) by 0 days.

(21) Appl. No.: 16/837,138

(22) Filed: Apr. 1, 2020

(65) Prior Publication Data
US 2021/0141471 A1   May 13, 2021

(30) Foreign Application Priority Data
Nov. 11, 2019 (CN) .......................... 201911094764.0

(51) Int. Cl.
*G06F 3/041* (2006.01)
*G06F 3/01* (2006.01)

(52) U.S. Cl.
CPC .............. *G06F 3/041* (2013.01); *G06F 3/017* (2013.01)

(58) Field of Classification Search
CPC ............... G06F 3/017; G06F 3/041661; G06F 3/04166; G06G 3/041
See application file for complete search history.

(56) References Cited

U.S. PATENT DOCUMENTS

| 9,122,332 | B2 * | 9/2015 | Li ........................ G06F 3/04166 |
| 9,244,579 | B2 * | 1/2016 | Liu ........................ G06F 3/0416 |
| 2015/0091859 | A1 * | 4/2015 | Rosenberg ............ G06F 3/0445 345/174 |
| 2015/0103035 | A1 * | 4/2015 | Kim .................. G06F 3/041662 345/174 |

(Continued)

*Primary Examiner* — Michael Pervan
(74) *Attorney, Agent, or Firm* — ScienBiziP, P.C.

(57) ABSTRACT

A touch panel able to recognize user commands whether from a finger actually touching or from a non-touching finger floating above the panel includes a substrate; a plurality of touch electrodes, a driver electrically connected to each touch electrode, and connection lines on the substrate. The touch electrodes are divided into a plurality of touch units, each touch unit including at least two touch electrodes. The driver outputs touch driving signals to drive each of the touch electrodes and can recognize more than one level of current as a result of actual touches or as a result of virtual or floating "touches" on the touch electrodes. Each connection line is electrically connected to the driver and one touch electrode. The driver is further configured to autonomously control the touch panel to work in a first touch mode or a second touch mode without manual switching by a user.

14 Claims, 8 Drawing Sheets

(56) References Cited

U.S. PATENT DOCUMENTS

| | | | |
|---|---|---|---|
| 2015/0205405 A1* | 7/2015 | Yumoto | G06F 3/041661 |
| | | | 345/174 |
| 2016/0216836 A1* | 7/2016 | Yao | G06F 3/041661 |
| 2019/0146610 A1* | 5/2019 | Teranishi | G02F 1/13338 |
| | | | 345/173 |
| 2020/0050341 A1* | 2/2020 | Tabata | G06F 3/041661 |

* cited by examiner

TOUCH PANEL RECOGNIZING VIRTUAL TOUCHES IN ADDITION TO ACTUAL TOUCHES, METHOD FOR OPERATION OF SUCH TOUCH PANEL, AND TOUCH DISPLAY DEVICE

FIELD

The subject matter herein generally relates to human-computer interfaces.

BACKGROUND

Touch panel as convenient operation devices are widely used in various smart devices for human-computer interaction, wherein common touch modes include a coordinate touch mode and a near-field gesture sensing mode.

A touch, panel usually includes multiple touch electrodes. Coordinates of a finger that is touching can be obtained through electrical signals on the multiple touch electrodes when the finger touches the touch panel. A touch panel can also sense the gesture of a non-touching finger at a certain distance in the near-field gesture sensing mode. The smaller the area of a single touch electrode, the higher is the accuracy of coordinates in the coordinate touch mode. A close but non-touching, finger in the near-field gesture sensing mode can create an electrical signal on one electrode but it is too weak to be sensed. The electrical signal in the area of the touch electrode needs to be enhanced in the near-field gesture sensing mode. A touch panel can only realize one-touch mode since the requirements for the coordinate touch mode and the near-field gesture sensing mode are contrary to each other.

Some touch panels can work in both the coordinate touch mode and the near-field gesture sensing mode. However, the two touch modes need to be manually switched over, which is inconvenient and cumbersome. Therefore, there is room for improvement in the art.

BRIEF DESCRIPTION OF THE DRAWINGS

Implementations of the present disclosure will now be described, by way of embodiment, with reference to the attached figures.

DETAILED DESCRIPTION

Figure 1:
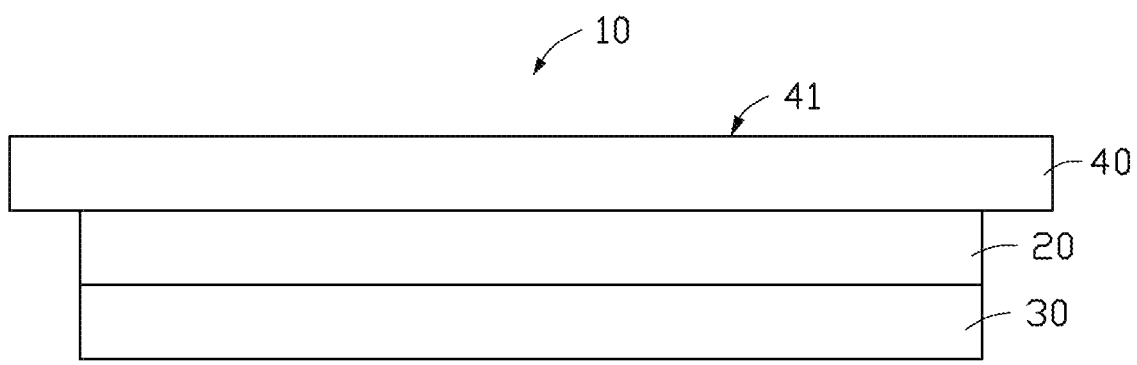
FIG. 1 is a schematic diagram of a touch display device according to a first embodiment of the present disclosure.

It will be appreciated that for simplicity and clarity of illustration, where appropriate, reference numerals have been repeated among different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising" when utilized, means "including, but not necessarily limited to"; it specifically indicates open-ended inclusion or membership in the so-described combination, group, series, and the like.

First Embodiment

Referring to FIG. 1, a touch display device 10 of the present embodiment includes a touch, panel 20, a display panel 30, and a cover 40. The touch panel 20 is stacked on the display panel 30. The cover 40 is located in a side of the touch panel 20 away from the display panel 30. In other embodiments, the touch panel 20 can be embedded in the display panel 30. The touch panel 20 is configured to identify touches and gestures applied to the touch display device 10 by users. The display panel 30 on a surface 41 of the cover 40 is configured to display images. The surface 41 is also configured to receive the touches and gestures of the users. In the present embodiment, "touch operations" means haptic and virtual-haptic commands of the users, particularly including the following two types: first, the user directly touching the surface 41 of the cover 40 with finger to make a coordinate touch and second, the finger remaining above the touch display device 10 and making a gesture (sliding, rotating, etc.), such non-touching operation by the finger is called a virtual-haptic or floating touch. The touch display device 10 in the present embodiment may be a monitor, a smartphone, a tablet computer, or a smart device that has both a touch function and a display function.

Figure 2:
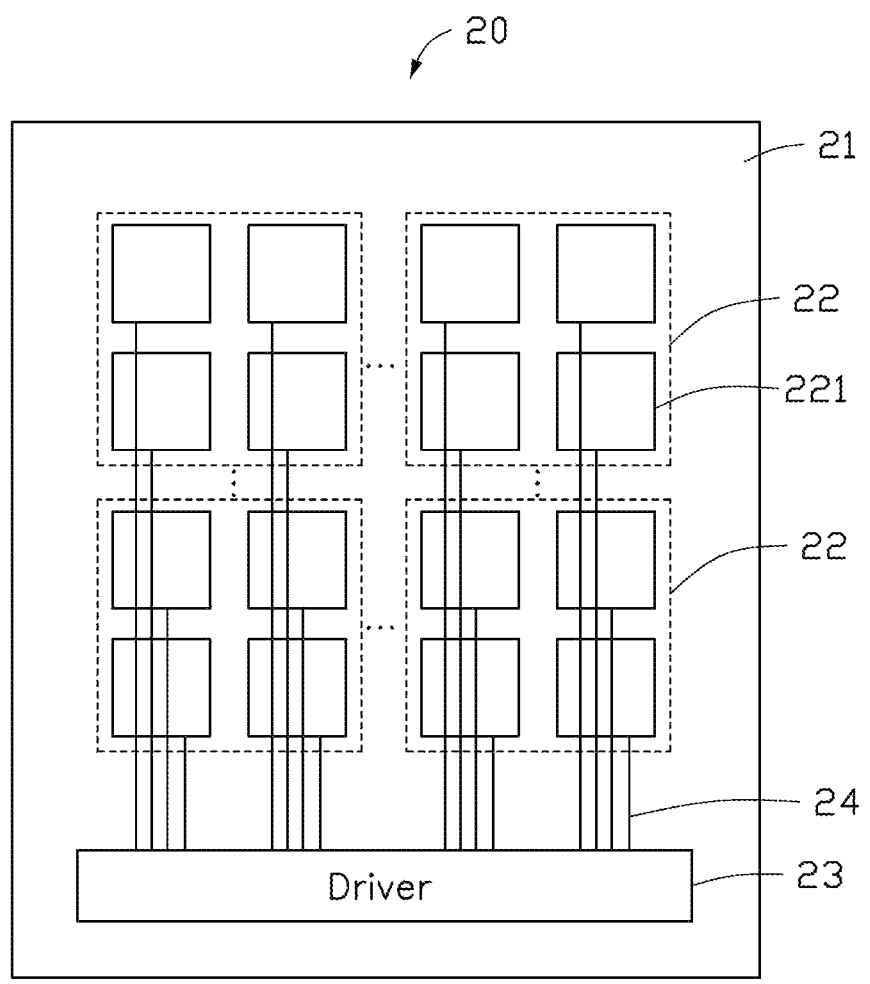
FIG. 2 is a planar view of the touch display device shown in FIG. 1.

Referring to FIG. 2, the touch panel 20 includes a substrate 21, a plurality of touch electrodes 221, a driver 23, and a plurality of connection lines 24 on the substrate 21. The touch electrodes 221 are divided into touch units 22, each touch unit 22 includes at least two touch electrodes 221. A number of touch electrodes 221 in each touch unit 22 may be equal, partially equal, or unequal. Each of the connection lines 24 is electrically connected to one touch electrode 221 and the driver 23. The driver 23 outputs touch driving signals to each of the touch electrodes 221 by the connection lines 24 and receives touch-sensing signals from the touch electrodes 221 through the connection lines 24 to identify the user's touch operation.

The substrate 21 is a glass substrate or a transparent film. Each touch electrode 221 is made of a transparent conductive material such as indium tin oxide. Referring to FIG. 2, the touch electrodes 221 are all the same shape and are rectangular in the present embodiment. All of the touch units 22 on the substrate 21 are arranged in an array, and all of the touch electrodes 221 on the substrate 21 are also arranged in an array. The touch panel 20 is a self-capacitive touch panel in the present embodiment.

Figure 3:
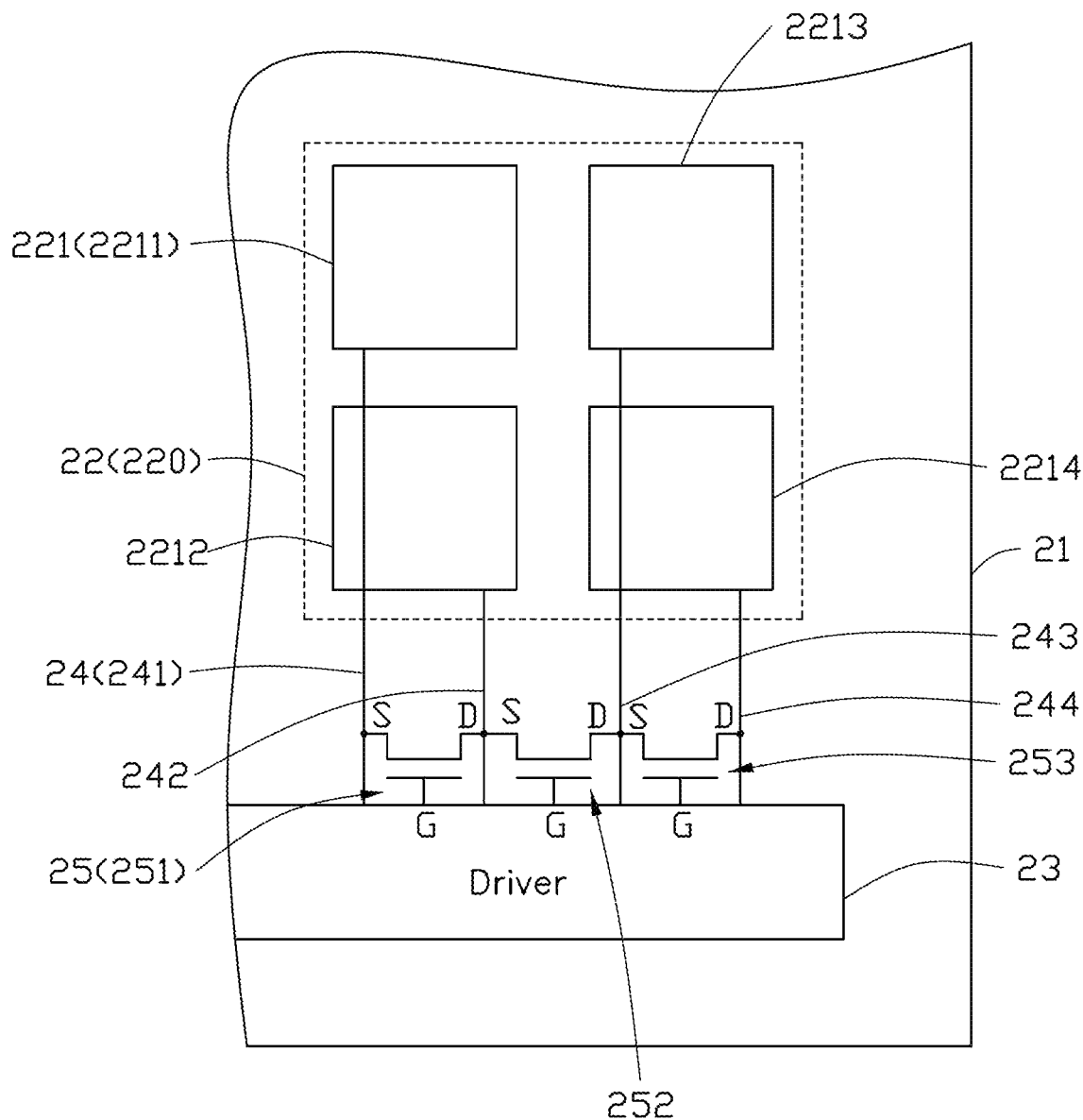
FIG. 3 is a partially enlarged view of the touch panel of FIG. 2.

Referring to FIG. 2 and FIG. 3, the touch panel further includes a plurality of first switching elements 25. Each first switching element 25 is electrically connected between adjacent connection lines 24, wherein the adjacent two connection lines 24 connect to touch electrodes 221 in a same touch unit 22. Taking the touch panel 20 in FIG. 2 as an example, the touch unit 22 includes a touch electrode 2211, a touch electrode 2212, a touch electrode 2213, and a touch electrode 2214. The touch electrode 2211 is electrically connected to a connection line 241, the touch electrode 2212 is electrically connected to a connection line 242, the touch electrode 2213 is electrically connected to a connection line 243, and the touch electrode 2214 is electrically connected to a connection line 244. The connection lines 241, 242, 243, and 244 are arranged in order from left to right as shown in FIG. 2. A first switching element 251 is provided between the connection line 241 and the connection line 242. A first switching element 252 is provided between the connection line 242 and the connection line 243. A first switching element 253 is provided between the connection line 243 and the connection line 244. Each of the first switching elements 251, 252, and 253 is a triode in the present embodiment. The gate "G" of the triode is electrically connected to the driver 23. The source electrode "S" and the drain electrode "D" are each connected to one connection line 24. For example, the source electrode "S" of the transistor 251 is electrically connected to the connection line 241, and the drain electrode "D" of the transistor 251 is electrically connected to the connection line 242. In other embodiments, the first switching element 25 may also be selected from three-terminal elements such as a field-effect transistor. The connection method is similar to that of the triode, the control terminal of the field-effect transistor is connected to the driver 23, and the other two terminals are each electrically connected to one connection line 24.

Referring to FIG. 2, according to an operating characteristics of a triode, the source electrode and the drain electrode of the triode are electrically coupled to each other when the voltage applied to the gate "G" of the triode is greater than a threshold voltage of the triode (the threshold voltage is determined by the hardware parameters of the triode itself). The gate "G" of the first switching element 25 is connected to the driver 23 in the present embodiment, the source electrode and the drain electrode of the triode are electrically insulated from each other when a voltage from the driver 23 to the gate "G" of the first switching element 25 is less than the threshold voltage of the first switching element 25. The two connection lines 24 which are connected to the source electrode "S" and the drain electrode "D" of the first switching element 25 are connected in parallel to each other when S and D are electrically coupled to each other, wherein touch electrodes 221 electrically connected with the two connection lines 24 are also connected in parallel with each other. The S and D of the triode are electrically coupled to each other when the voltage from the driver 23 to the gate "G" of the first switching element 25 is greater than the threshold voltage of the first switching element 25. The two connection lines 24 which are connected to the S and the D of the first switching element 25 are connected in series to each other when the source electrode and the drain electrode of the triode are electrically coupled to each other, wherein touch electrodes 221 electrically connected with the two connection lines 24 are also connected in series with each other. Each of the plurality of first switching elements 25 can be switched on or off by the voltage from the driver 23 to the gate "G" of the first switching element 25. Thus, the electrical connection relationship of touch electrodes 221 in each touch unit 22 is can be made serial or parallel.

Referring to FIG. 1 and FIG. 2, the touch panel 20 works in a first touch mode and a second touch mode. The touch panel 20 is used to coordinate touch in the first touch mode, wherein the touch panel 20 is configured to obtain touch coordinates on the touch panel 20 of a user's finger. The touch panel 20 is used for performing near-field gesture sensing in the second touch mode, that is, for sensing the gesture of the user's finger, wherein the user's finger does not touch the cover 40. When the touch panel 20 works in the first touch mode, each first switching element 25 remains off, and touch electrodes 221 in each touch unit 22 are electrically connected in a parallel, each touch electrode 221 on the substrate 21 receiving the touch driving signals output by the driver 23 and independently sending back the touch-sensing signals to the driver 23. When the touch panel 20 works in the second touch mode, each of the first switching elements 25 remains on, each touch electrode 221 in each touch unit 22 is connected in series. All touch electrodes 221 in a same touch unit 22 collectively receive the touch driving signal output by the driver 23 and send back the touch-sensing signal to the driver 23 collectively. That is, by controlling the voltage from the driver 23 to the gate "G" of each first switching element 25, each first switching element 25 is switched off or on so as to control the serial or parallel connection relationship of touch electrodes 221 in each touch unit 22. The touch panel 20 is controlled to work in the first touch mode or the second touch mode.

Values of the touch driving signals outputted by the driver 23 to each of the touch electrodes 221 are the same when the touch panel 20 works in the first touch mode. V1 represents values of the touch driving signals outputting by the driver 23 to each of the touch electrodes 221 when the touch panel 20 works in the first touch mode. V2 represents values of the touch driving signals output by the driver 23 to each of the touch units 22 when the touch panel 20 works in the second touch mode. V2 is an integer multiple of and thus greater than V1. The actual multiple is the number of touch electrodes 221 in one touch unit 22. For example, if V1 equals 5 mA, and each touch unit 22 includes four touch electrodes 221 then V2 equals 4 times 5 mA, which is 20 mA.

Referring to both FIG. 1 and FIG. 3, the user's finger touches the cover 40, the touch panel 20 is configured to obtain specific touch coordinates of the user's finger when the touch panel 20 works in the first touch mode. The smaller the area of each touch electrode 221, the more accurate are the touch coordinates. Since in the second touch mode the user's finger is suspended above and away from the touch electrode 221, a value of the touch-sensing signal is less than that in the first touch mode. In order to increase the value of the touch-sensing signal in the second touch mode, all touch electrodes 221 in each touch unit 22 are connected in series, so that each touch unit 22 can be at least equivalent to one touch electrode block 220. An area of the touch electrode block 220 is the sum of areas of the touch electrodes 221 in the touch unit 22, Therefore, in the second touch mode, each touch unit 22 on the substrate 21 is equivalent to a touch electrode block 220. The area of the touch electrode block 220 is significantly larger than the area of one touch electrode 221 (being an integer multiple of the area of one touch electrode 221), so the value of the touch-sensing signals generated by each touch electrode block 220 and the user's floating finger is effectively amplified. The problem of a low-magnitude touch-sensing signal generated during near-field gesture sensing is thus avoided. The touch panel 20 not only achieves coordinate touch by the touch electrode 221 with a smaller area, but the touch electrode block 220 also generates large-area signals for near-field gesture sensing.

Figure 4:
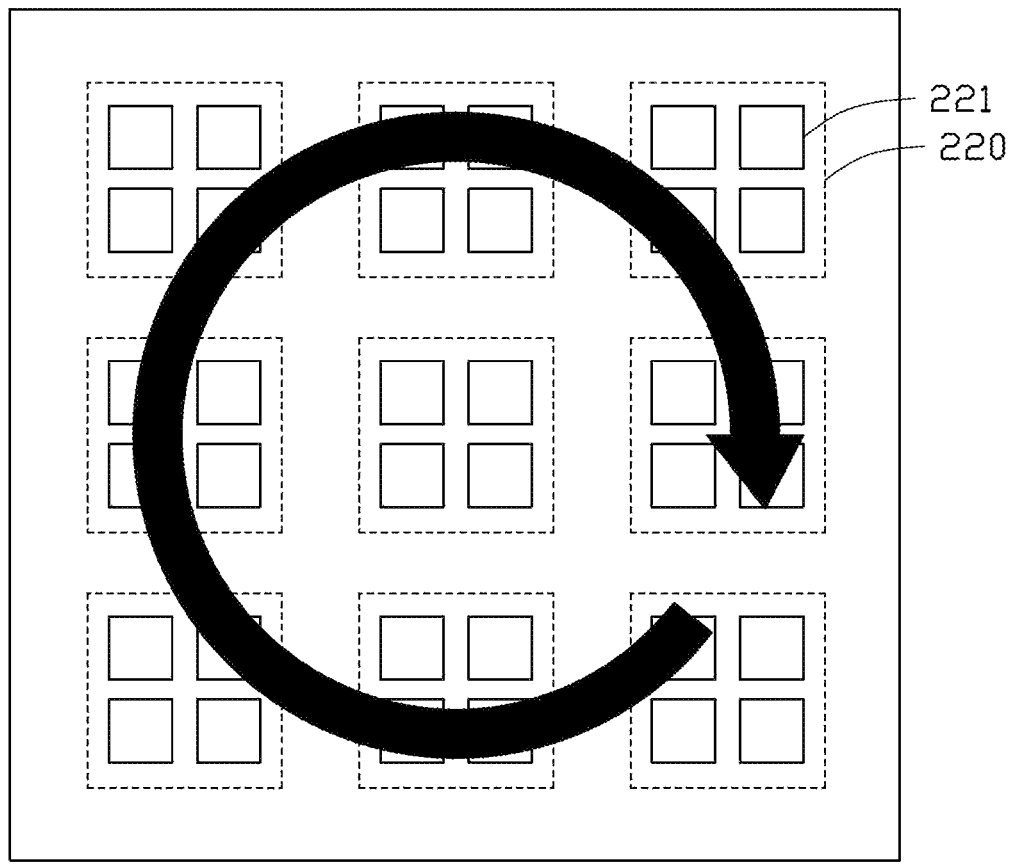
FIG. 4 is a planar view of a gesture that can be sensed when the touch panel of FIG. 2 is in a second touch mode according to the present disclosure.
Figure 5:
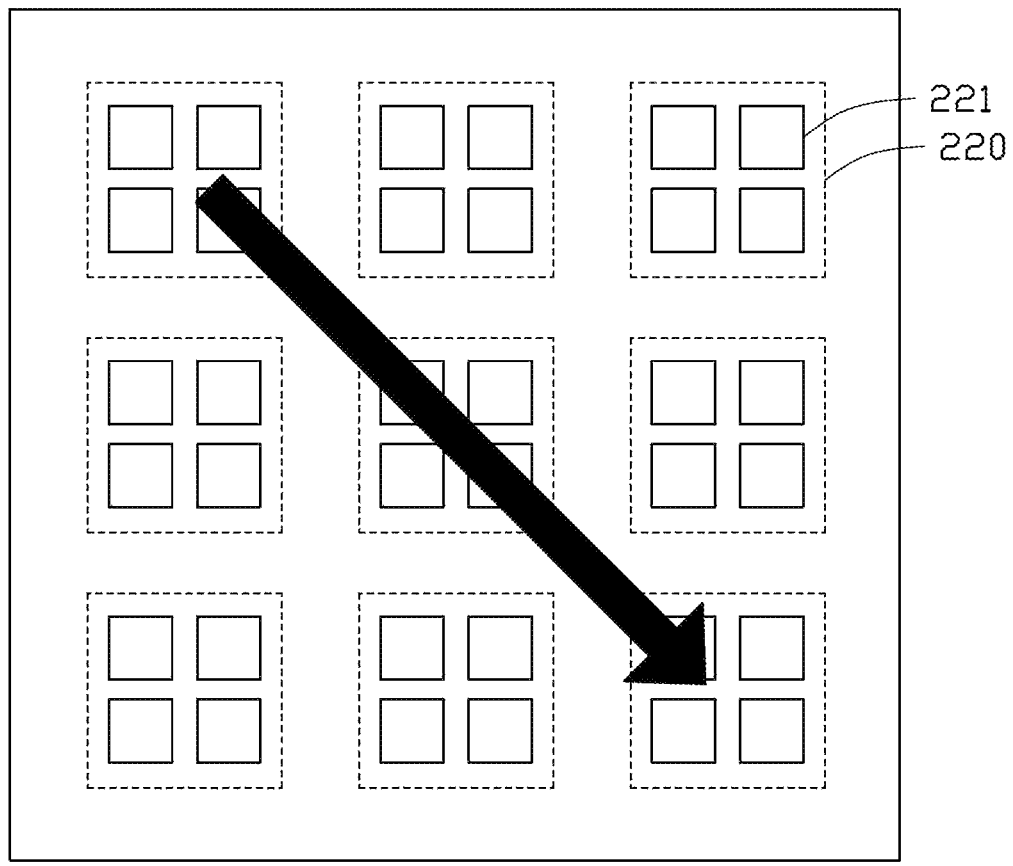
FIG. 5 is a planar view of another gesture that can be sensed when the touch panel of FIG. 2 is in the second touch mode according to the present disclosure.
Figure 6:
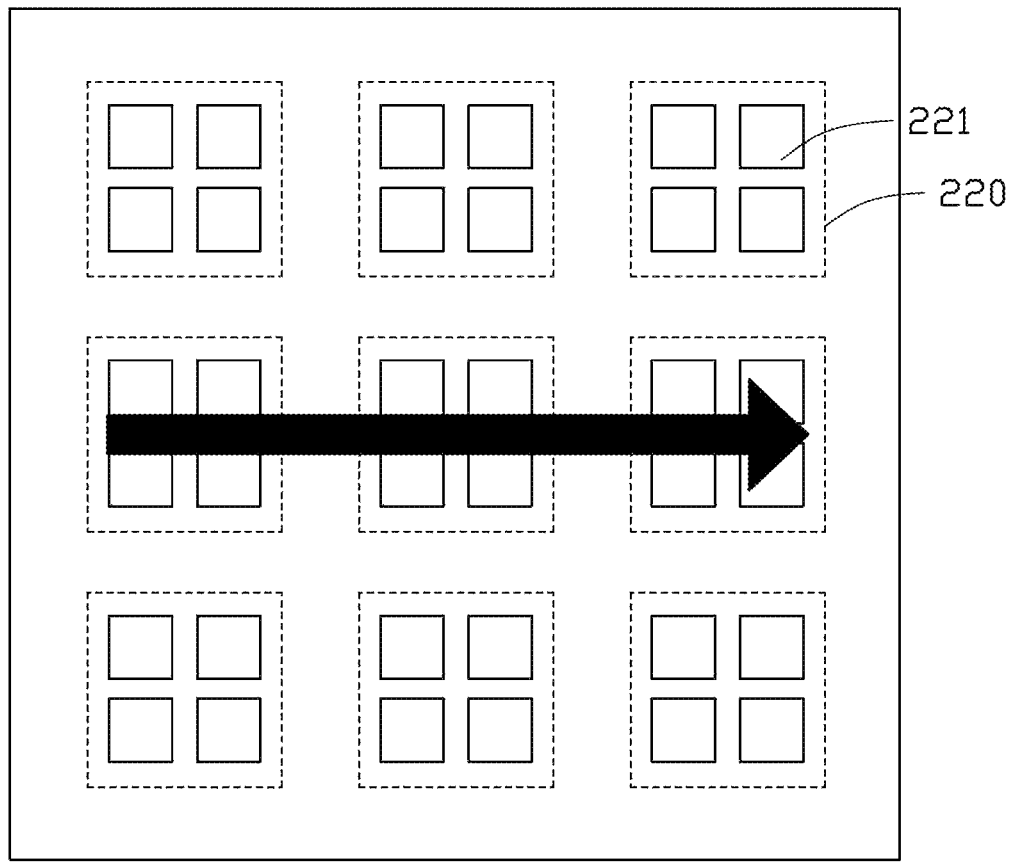
FIG. 6 is a planar view of another gesture that can be sensed when the touch panel of FIG. 2 is in the second touch mode according to the present disclosure.

FIG. 4 through FIG. 6 show examples of gestures made by the user's finger. Bold arrow track indicates a track of the user's finger, an arrow direction indicates a movement direction of the user's finger. The touch panel 20 senses the gestures shown in FIG. 4 to FIG. 6 by each touch electrode block 220, and recognizes the commands.

The touch panel 20 in the present embodiment controls the state (coupled to each other or not coupled) between the source electrode "S" and the drain electrode "D" of each first switching element 25 by controlling the voltage from the driver 23 to the gate "G" of each first switching element 25. The touch panel 20 can, virtually simultaneously, work in the first touch mode and in the second touch mode. The structure of each touch electrode 221 does not need to be changed. The process of switching the first touch mode and the second touch mode is achieved by controlling the voltage to G, no manual switching by the user is required.

In this embodiment, there will be noise in the touch-sensing signals corresponding to each of the plurality of touch electrodes 221 whether in the first touch mode or the second touch mode. The waveform of the noise will be positive and negative in time division (the waveform does not necessarily alternate between positive and negative periodically on a regular basis). Each touch unit 22 is used as a touch electrode block 220 in the second touch mode. Noise of the touch-sensing signal corresponding to each touch unit 22 is the superimposition of noise of the touch-sensing signals corresponding to all touch electrodes 221 in the touch unit 22. The waveform of the noise is time-shared between positive values and negative values. The distribution of positive values and negative values of the noise corresponding to each touch electrode 221 in the touch unit 22 is inconsistent in most situations. Therefore, the positive values may be offset by the negative values when the noise corresponding to each touch electrode 221 is superimposed. The superimposed noise corresponding to a touch unit 22 is smaller compared with the sum of the noise corresponding to each touch electrode 221 in the touch unit 22 that are not connected in series Therefore, the touch panel 20 is able to work in, the second touch mode provided in the present embodiment also improves the signal-to-noise ratio (the ratio of the signal value to the noise value) of the touch-sensing signals and improves the touch accuracy.

Figure 7:
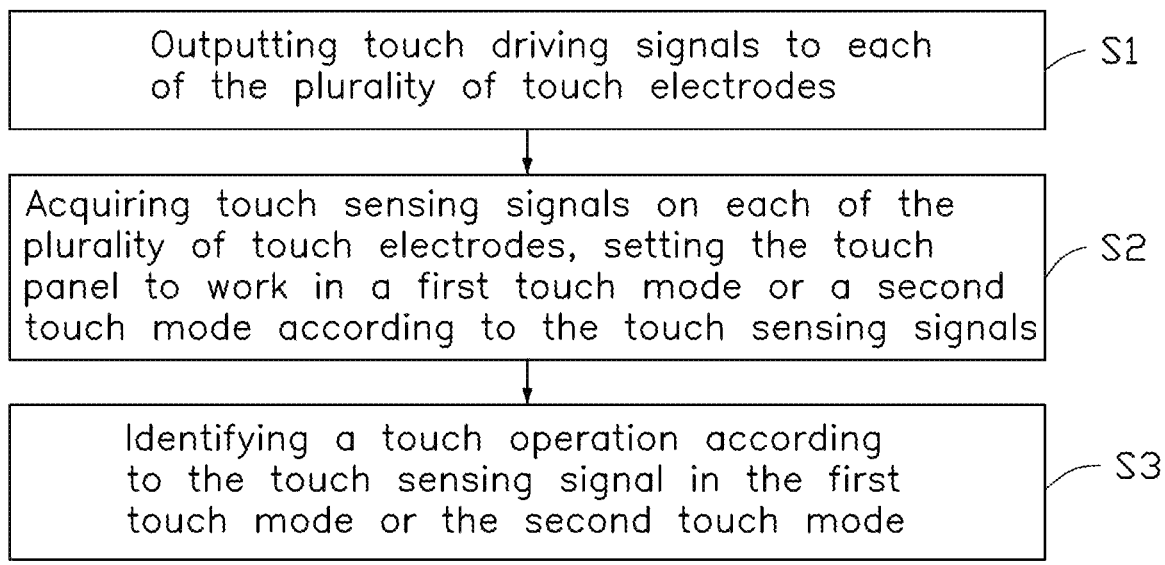
FIG. 7 is a flow chart of a method for recognizing haptic and virtual-haptic commands according to the first embodiment.

A working process of the driver 23 will be described in detail below. Referring to FIG. 7, a touch method applied to the touch panel 20 as described above is provided in the present embodiment, the touch method includes:

Block S1: outputting touch driving signals to each of the plurality of touch electrodes;

Block S2: acquiring touch-sensing signals from each of the plurality of touch electrodes, setting the touch panel to work in a first touch mode or a second touch mode according to the touch-sensing signals;

Block S3: identifying a touch operation according to the touch-sensing signal in the first touch mode or the second touch mode.

Referring to FIG. 2 and FIG. 7 together, the driver 23 outputs the touch driving signals to each touch electrode 221 when the touch panel 20 is working. If the user's finger is touching the touch panel 20, the touch-sensing signal can be generated on the touch position of the user's finger. The driver 23 receives the touch-sensing signal and controls the touch panel 20 to work in the first touch mode or the second touch-sensing mode according to the touch-sensing signal in the Block S2.

Figure 8:
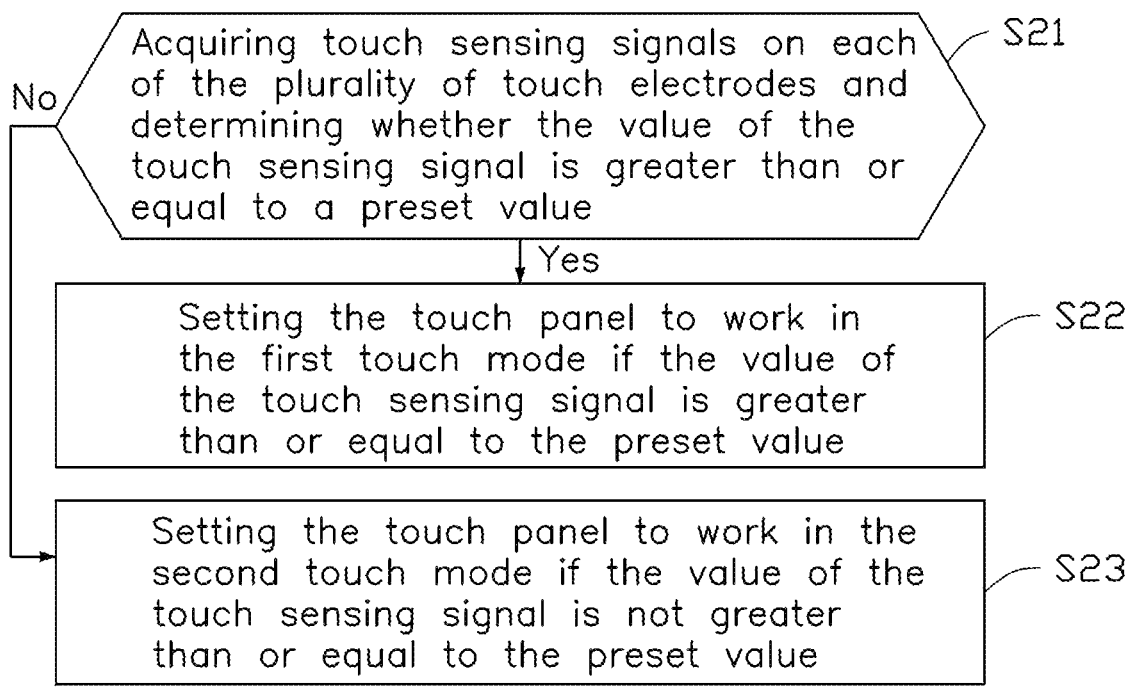
FIG. 8 is a chart of sub-flow of the method in FIG. 7.

Referring to FIG. 8, Block S2 further includes:

Block S21: acquiring touch-sensing signals from the touch electrodes and determining whether the value of current of the touch-sensing signal is greater than or equal to a preset value;

Block S22: setting the touch panel to work in the first touch mode if the value is at least equal to the preset value;

Block S23: setting the touch panel to work in the second touch mode if the value of the touch-sensing signal is less than equal to the preset value.

The first touch mode is a coordinate touch mode, that is, the user's finger directly contacts the surface 41 of the cover e 40 and a touch-sensing signal V3 is generated. The second touch mode is a near-field gesture sensing mode, that is, the user's finger is suspended without touching the cover 40 and a touch-sensing signal V4 is generated. The value of V3 is greater than the value of V4. When the user's finger is gradually brought closer to the surface 41 in the second touch mode, the value of the touch-sensing signal will suddenly increase when the user's finger actually touches the surface 41 of the cover 40.

Therefore, in the Block S21, a preset value is set, the driver 23 can determine whether the user is using the coordinate touch or the near-field gesture sensing by comparing the value of the touch-sensing signal with the preset value. As described above, the value of the touch-sensing signal generated during the coordinate touch is greater than that during the near field gesture sensing. If it is determined in Block S21 that the value of the touch-sensing signal is greater than or equal to the preset value, it is also determined that the user is using coordinate touch in the Block S22, and then the driver 23 sets the touch panel 20 to work in the first touch mode. If it is determined that the value of the touch-sensing signal is less than the preset value in the Block S21, it is also determined that the user is using near-field gesture sensing in the Block S23, and then the driver 23 sets the touch panel 20 to work in the second touch mode.

Figure 9:
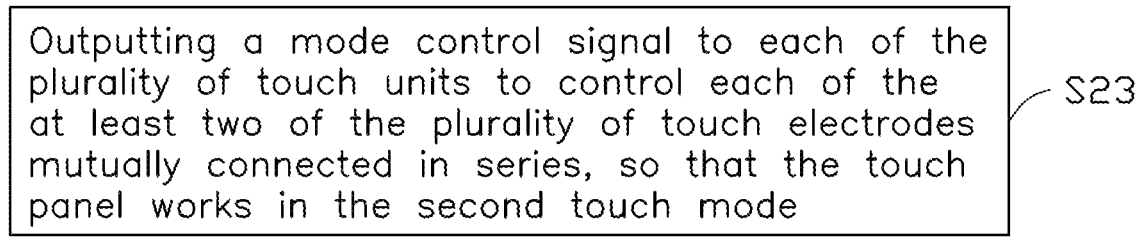
FIG. 9 is a chart of sub-flow of the method in FIG. 8.

Referring to FIG. 9, the Block S23 further includes outputting a mode control signal to each of the plurality of touch units to connect all the touch electrodes in series, so that the touch panel works in the second touch mode.

Referring to FIG. 2 and FIG. 9 together, the driver 23 outputs a mode control signal to each touch unit 22 if the second mode is determined. The driver 23 outputs a mode control signal to the gate "G" of the first switching element 25 between the connection lines 24 electrically connected to each touch electrode 221 in each touch unit 22 to switch on each first switching element 25. Each touch electrode 221 in the touch unit 22 will thus be connected in series, and the touch panel 20 is in the second touch mode.

According to the touch method provided in the present embodiment, the driver 23 controls each of the first switching elements 25 to be off or on according to the received touch-sensing signal, thereby controlling each touch electrode 221 in each touch unit 22 to be electrically connected in parallel or in series, and further controls the touch panel 20 to work in the first touch mode or the second touch mode. The touch panel 20 thus recognizes coordinate touch and near-field gesture sensing in a time-division manner.

There may be several touches when performing coordinate touch with a finger. For example, the user can make two distinct touches on the cover 40, and even if the interval between the two touches is very short, the finger does leave the cover 40 between the first touch and the second touch. It will be determined that the value of the touch-sensing signal is less than the preset value in Block S21 because the finger has left the cover 40, thus the driver 23 will set the touch panel 20 to work in the second touch mode. It will be determined that the value of the touch-sensing signal is greater than the preset value in Block S21 when the finger again touches the cover 40, thus the driver 23 will set the touch panel 20 to work in the first touch mode again. The finger leaving and regaining the cover 40 between the first touch and the second touch of the finger does not require a user-switch from the first touch mode to the second touch mode or the reverse. The working process above may simply cause an (unfortunate) increase in the number of switching times between the first touch mode and the second touch mode.

Accordingly, a preset duration T1 can be set in another embodiment of the present disclosure. T2 represents the duration that the touch-sensing signal remains at less than the preset value. If it is determined that the value of the touch-sensing signal is less than the preset value in Block S21, a determination is made as to whether T2 is longer than T1. Block S23 is performed if T2 is longer than T1, the Block S22 is performed if T2 is not longer than T1.

If T2 is found to be longer than T1, it is determined that the less-than-preset value of the touch-sensing signal is not an anomaly, and Block S23 is performed, the driver 23 controls the touch panel 20 to work in the second touch mode. If T2 is found to be shorter than T1, it is determined that the T2 value is an anomaly, caused by the finger accidentally leaving the cover 40 during the first touch and the second touch, thus Block S22 is performed, and the driver 23 controls the touch panel 20 to work in the first touch mode. T1 may be set to, for example, 1 minute. That is, the second touch mode is activated only when it is determined that T2 is longer than 1 minute long.

Therefore, the touch method can switch virtually instantaneously between the first touch mode and the second touch mode.

Second Embodiment

Figure 10:
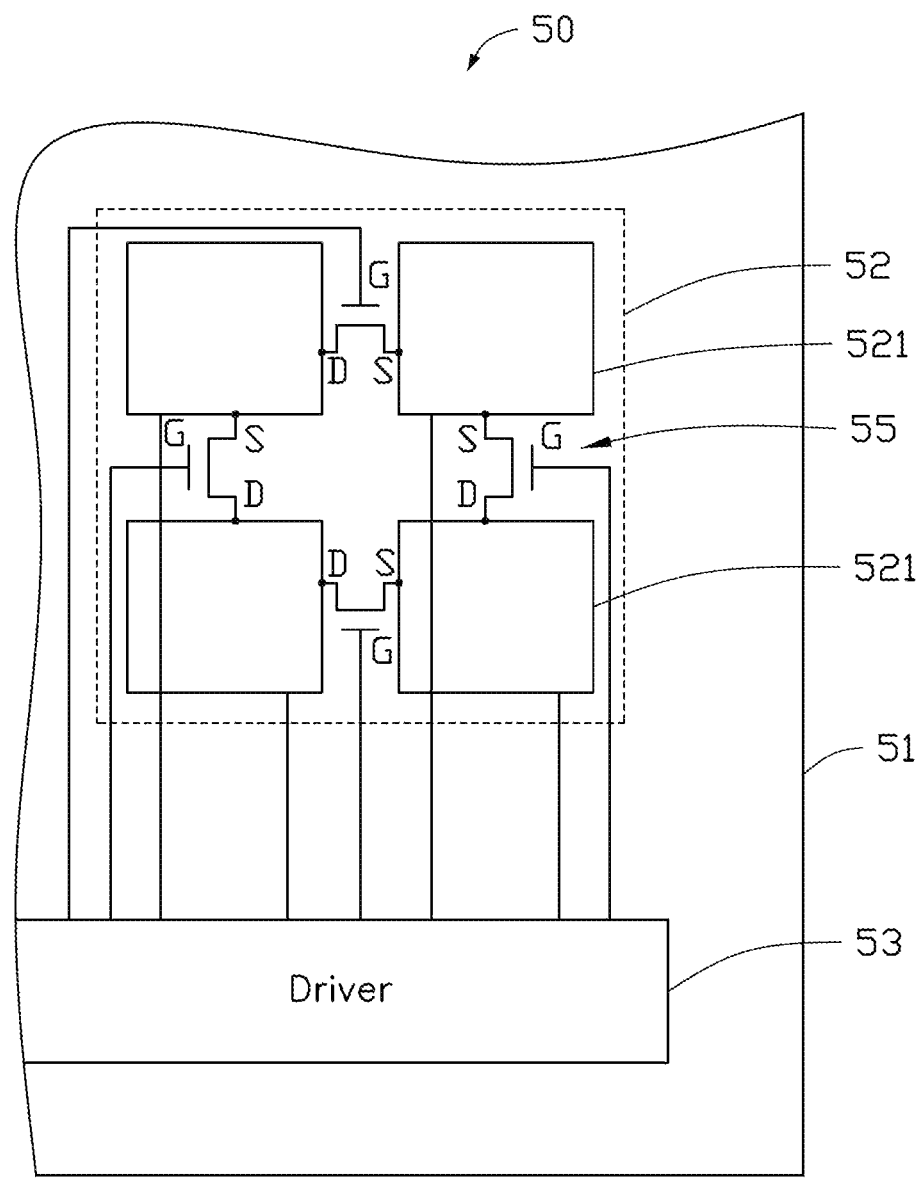
FIG. 10 is a planar view of a touch panel according to a second embodiment according to the present disclosure.

Referring to FIG. 10, the touch panel 50 of the present embodiment is basically the same as the touch panel 20 of the first embodiment. A main difference between the touch panel 50 and the touch panel 20 is that the touch panel 50 includes a plurality of second switching elements 55 instead of the first switching elements 25.

Referring to FIG. 10, each second switching element 55 is electrically connected between two adjacent touch electrodes 521 in each touch unit 52 in the touch panel 50 provided in the present embodiment. Each second switching element 55 is a thin film transistor and is provided on the substrate 5L The gate "G" of each second switching element 55 is electrically connected to the driver 53, the source electrode "S" and the drain electrode "D" are each connected to one touch electrode 521. According to the operating characteristics of a thin film transistor, the S and D of each second switching element 55 are electrically coupled to each other when the voltage applied to the gate "G" of the each second switching element 55 reaches a threshold voltage. Wherein each touch electrode 521 in a same touch unit 52 is connected in series with each other, and the touch panel 50 works in the second touch mode. The S and D of each second switching element 55 are not electrically coupled to each other when the voltage applied to the gate "G" of each second switching element 55 is less than the threshold voltage. Wherein the touch electrodes 521 in each touch unit 52 are then connected in parallel with each other, and the touch panel 50 works in the first touch mode.

Therefore, the driver 53 outputs a voltage to the gate "G" of each second switching element 55 to control each second switching element 55 to be on or oft thereby controlling the electrical connection relationship of each touch electrode 521 in each touch unit 52 to be in parallel or in series, and the touch panel 50 is further controlled to work in the first touch mode or the second touch mode. The touch panel 50 is used to coordinate touches and near-field gesture sensing in a time-division manner.

A working process of the touch panel 50 is basically the same as that of the touch panel 20 described in the first embodiment. It should be understood that the touch panel 50 provided in the present embodiment can achieve all the functions described in the first embodiment.

It is to be understood, even though information and advantages of the present embodiments have been set forth in the foregoing description, together with details of the structures and functions of the present embodiments, the disclosure is illustrative only. Changes may, be made in detail, especially in matters of shape, size, and arrangement of parts within the principles of the present embodiments to the full extent indicated by the plain meaning of the terms in which the appended claims are expressed.

What is claimed is:

1. A touch panel comprising:
   a substrate;
   a plurality of touch electrodes on the substrate, the plurality of touch electrodes being divided into a plurality of touch unit, each of the plurality of touch units comprising at least two of the plurality of touch electrodes;
   a driver on the substrate and electrically connected to each of the plurality of touch electrodes, the driver configured to output touch driving signals to drive each of the plurality of touch electrodes and to recognize touch operations according to touch-sensing signals on each of the plurality of touch electrodes; and
   a plurality of connection lines on the substrate, each of the plurality of connection lines electrically connected to the driver and one of the plurality of touch electrodes;
   wherein the driver is further configured to determine whether a current value of the touch-sensing signals is less than a preset value,
   if the current value is less than the preset value, the driver is further configured to determine whether a duration that the current value remains less than the preset value is longer than a preset duration,
   the driver is further configured to set the touch panel to work in a first touch mode if the duration that the current value remains less than the preset value is not longer than the preset duration, and to set the touch panel to work in a second touch mode if the duration that the current value remains less than the preset value is longer than the preset duration; and
   each of the plurality of touch electrodes is connected in parallel with each other to independently receive the touch driving signals from the driver when the touch panel works in the first touch mode; each of the at least two of the plurality of touch electrodes in each touch unit is connected in series to receive the touch driving signals from the driver when the touch panel works in the second touch mode.

2. The touch panel of claim 1, further comprising a plurality of first switching elements, each of the plurality of first switching elements is electrically connected between adjacent two connection lines connected to the touch electrodes in a same touch unit;
  each of the plurality of first switching elements is off when the touch panel works in the first touch mode, and each of the plurality of first switching elements is on when the touch panel works in the second touch mode;
  the driver is further configured to control each of the plurality of first switching elements to be on or off according to the touch-sensing signals.

3. The touch panel of claim 2, wherein each of the plurality of first switching elements is a field effect transistor or a triode.

4. The touch panel of claim 1, further comprising a plurality of second switching elements, each of the plurality of second switching elements is electrically connected between adjacent two touch electrodes in a same touch unit;
  each of the plurality of second switching elements is off when the touch panel works in the first touch mode, and each of the plurality of second switching elements is on when the touch panel works in the second touch mode;
  the driver is further configured to control each of the plurality of second switching elements to be on or off according to the touch-sensing signals.

5. The touch panel of claim 4, wherein each of the plurality of second switching elements is a thin film transistor.

6. The touch panel of claim 1, wherein the first touch mode is a coordinate touch mode, and the second touch mode is a near-field gesture sensing mode.

7. A touch display device comprising:
  a touch panel, wherein the touch panel comprising:
    a substrate;
    a plurality of touch electrodes on the substrate, the plurality of touch electrodes being divided into a plurality of touch units, each of the plurality of touch units comprising at least two of the plurality of touch electrodes;
    a driver on the substrate and electrically connected to each of the plurality of touch electrodes, the driver configured to output touch driving signals to drive each of the plurality of touch electrodes and to recognize touch operation according to touch-sensing signals on each of the plurality of touch electrodes; and
    a plurality of connection lines on the substrate, each of the plurality of connection lines electrically connected to the driver and one of the plurality of touch electrodes;
    wherein the driver is further configured to determine whether a current value of the touch-sensing signals is less than a preset value,
    if the current value is less than the preset value, the driver is further configured to determine whether a duration that the current value remains less than the preset value is longer than a preset duration,
    the driver is further configured to set the touch panel to work in a first touch mode if the duration that the current value remains less than the preset value is not longer than the preset duration, and to set the touch panel to work in a second touch mode if the duration that the current value remains less than the preset value is longer than the preset duration; each of the plurality of touch electrodes is connected in parallel with each other to independently receive the touch driving signals from the driver when the touch panel works in the first touch mode; each of the at least two of the plurality of touch electrodes in each touch unit is connected in series to receive the touch driving signals from the driver when the touch panel works in the second touch mode; and
  a display panel for displaying an image according to the touch operation.

8. The touch display device of claim 7, further comprising a plurality of first switching elements, each of the plurality of first switching elements is electrically connected between adjacent two connection lines connected to the touch electrodes in a same touch unit;
  each of the plurality of first switching elements is off when the touch panel works in the first touch mode, and each of the plurality of first switching elements is on when the touch panel works in the second touch mode;
  the driver is further configured to control each of the plurality of first switching elements to be on or off according to the touch-sensing signals.

9. The touch display device of claim 8, wherein each of the plurality of first switching elements is a field effect transistor or a triode.

10. The touch display device of claim 7, further comprising a plurality of second switching elements, each of the plurality of second switching elements is electrically connected between adjacent two touch electrodes in a same touch unit;
  each of the plurality of second switching elements is off when the touch panel works in the first touch mode, and each of the plurality of second switching elements is on when the touch panel works in the second touch mode;
  the driver is further configured to control each of the plurality of second switching elements to be on or off according to the touch-sensing signals.

11. The touch display device of claim 10, wherein each of the plurality of second switching elements is a thin film transistor.

12. The touch display device of claim 7, wherein the first touch mode is a coordinate touch mode, and the second touch mode is a near-field gesture sensing mode.

13. A touch method applied to a touch panel comprising a plurality of touch electrodes; the touch method comprising:
  outputting touch driving signals to each of the plurality of touch electrodes;
  acquiring touch-sensing signals from each of the plurality of touch electrodes;
  determining whether a current value of the touch-sensing signals is less than a preset value;
  if the current value is less than the preset value, determining whether a duration that the current value remains less than the preset value is longer than a preset duration;
  setting the touch panel to work in a first touch mode if the duration that the current value remains less than the preset value is not longer than the preset duration, and setting the touch panel to work in a second touch mode if the duration that the current value remains less than the preset value is longer than the preset duration;
  identifying a touch operation according to the touch-sensing signals in the first touch mode or the second touch mode.

14. The touch method of claim 13, wherein the plurality of touch electrodes is divided into a plurality of touch units, each of the plurality of touch units comprises at least two of the plurality of touch electrodes; setting the touch panel to work in the second touch mode comprises:
outputting a mode control signal to each of the plurality of touch units to control the at least two of the plurality of touch electrodes connected in series.

* * * * *